United States Patent [19]

Benoit et al.

[11] Patent Number: 4,918,886
[45] Date of Patent: Apr. 24, 1990

[54] RACEWAY SYSTEM FOR MODULAR WALL PANELS

[75] Inventors: Fredrick C. Benoit, Corona; Ruben Cardenas, Culver City; Daniel Schmid, Torrance; Joseph M. Wisniewski, Huntington, all of Calif.

[73] Assignee: Harpers, Torrance, Calif.

[21] Appl. No.: 359,287

[22] Filed: May 31, 1989

[51] Int. Cl.$^5$ ............................................. E04F 17/00
[52] U.S. Cl. ....................................... 52/221; 52/241; 52/242; 52/287; 52/126.2; 174/48
[58] Field of Search ................ 52/126.1, 126.2, 126.6, 52/220, 221, 239, 240, 241, 242, 287, 288, 290; 174/48, 49

[56] References Cited

U.S. PATENT DOCUMENTS

| | | | |
|---|---|---|---|
| 1,990,259 | 2/1935 | Walters | 189/34 |
| 3,255,563 | 6/1966 | Saver | 52/221 X |
| 4,043,626 | 8/1977 | Propst et al. | 339/23 |
| 4,080,766 | 3/1978 | Jastrabek | 52/242 |
| 4,133,153 | 1/1979 | Hage | 52/220 |
| 4,231,630 | 11/1980 | Propst et al. | 52/221 X |
| 4,257,203 | 3/1981 | Propst et al. | 52/221 |
| 4,270,020 | 5/1981 | Kenworthy et al. | 174/48 |
| 4,391,073 | 7/1983 | Mollenkopf et al. | 52/241 |
| 4,406,101 | 9/1983 | Heidmann | 52/220 |
| 4,555,880 | 12/1985 | Sism et al. | 52/242 X |
| 4,567,698 | 2/1986 | Morrison | 52/36 |
| 4,593,505 | 6/1986 | Russell | 52/221 |
| 4,596,098 | 6/1986 | Finkbeiner et al. | 52/220 |
| 4,634,212 | 1/1987 | Boundy et al. | 174/48 X |
| 4,703,985 | 11/1987 | Finkbeiner et al. | 52/227 X |
| 4,713,918 | 12/1987 | Cioffi | 52/221 |
| 4,720,953 | 1/1988 | Onishi et al. | 52/221 |
| 4,800,695 | 1/1989 | Menchetti | 52/221 |
| 4,841,699 | 6/1989 | Wilson et al. | 52/241 X |
| 4,845,904 | 7/1989 | Menchetti | 52/221 X |

Primary Examiner—David A. Scherbel
Assistant Examiner—Creighton Smith
Attorney, Agent, or Firm—Frederick E. Mueller

[57] ABSTRACT

A modular room divider panel includes a raceway along its lower edge which contains and shields one or more multi-wire power harnesses that are protected from unauthorized access by lockable raceway cover plates. The harness comprises a pair of connector blocks, each formed with a pair outwardly endwise facing electrical connector receptacles connected to opposite ends of a bundled plurality of individual and individually insulated conductor wires. A medial web of the raceway frame has a central aperture through which an intermediate portion of the bundled conductor wires pass between opposite sides of the web and a pair of slots at opposite ends of the central aperture which seat the connector blocks such that the pair of receptacles of a connector blocks are disposed on opposite sides of the web. To accommodate a second harness, the medial web may be formed with another pair of openings spaced such that the pair of harnesses are mounted in overlapping or staggered relationship. The opposite side pair of raceway covers and corresponding parts of the raceway frame incorporate spring loaded locks which are actuatable only by means of an auxiliary tool which is insertible through an opening in the raceway cover.

22 Claims, 5 Drawing Sheets

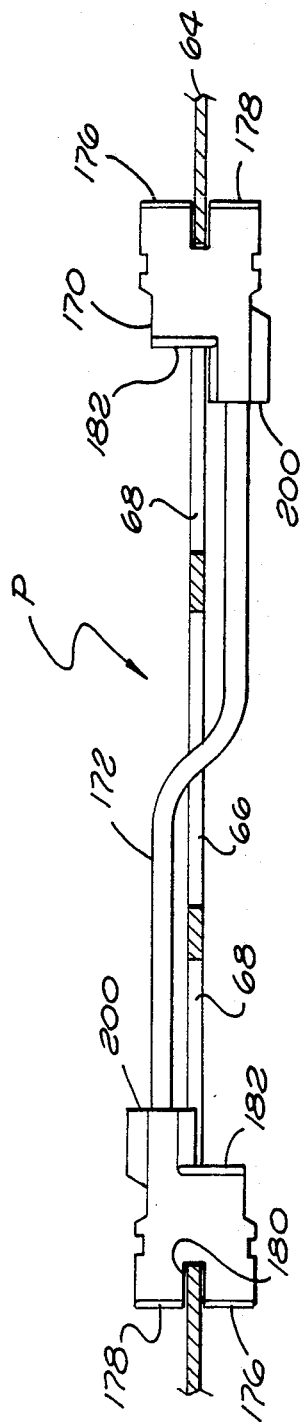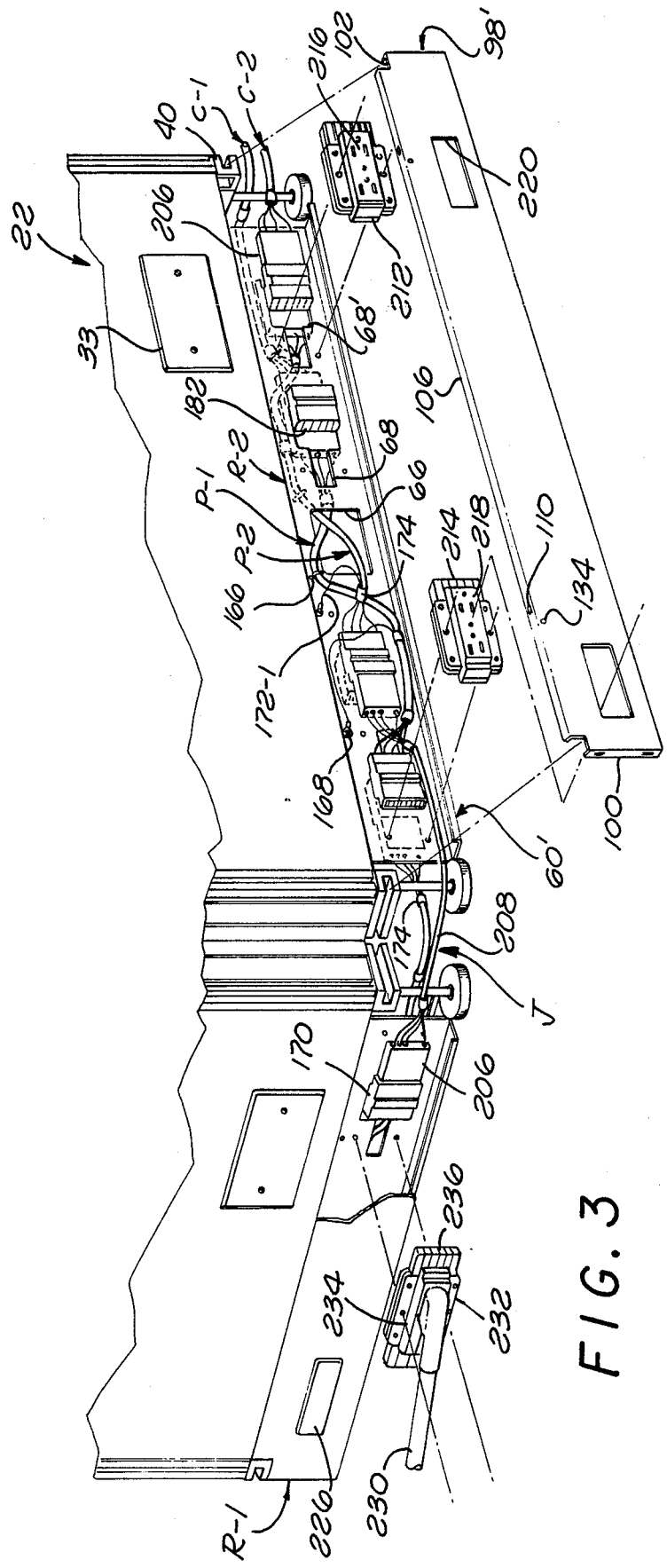

RACEWAY SYSTEM FOR MODULAR WALL PANELS

BACKGROUND OF THE INVENTION

The present invention relates to wall systems made up of prefabricated modular panels of the kind which are frequently used in dividing an interior space, such as an office or commercial establishment, in a desired layout. More particularly, the present invention relates to the electrical power systems contained within such wall systems and panels.

Typically, a wall system comprises a plurality of interconnected panels arranged in a desired layout. The panels are prefabricated and generally are available in a variety of modular sizes with respect to the height and width of the panels. However, irrespective of their height and width, the panels typically are of a uniformly thin construction because of aesthetic and space saving considerations. For example, a manufacturer may have panels available in a variety of modular widths between 20 inches and 60 inches and a variety of heights ranging between 34 inches and 80 inches, with all of the available panels having a nominal thickness of 2 inches.

Typically, in addition to meeting certain structural and acoustical requirements, some or all of the modular panels of a wall system may also be required to contain concealed electrical and communication wiring. Accordingly, previously available panels commonly provide usually separate raceways for communications and electrical wiring. The communication raceway may be located at the base of the panel directly above or alongside the electrical raceway. The bottom edge of the panel appears to be the preferred location for the electrical raceway. However, in view of the thinness of the panel, the necessity for shielding the electrical wiring, and the desire of customers to increase the number of circuits available in the electrical raceway, it has become increasingly more difficult to accommodate the demand for a greater number of power circuits while still meeting such aesthetic and space considerations as the thinness of the panel and a limited raceway height. By way of example, it has been found impractical to provide three separate DX or conduit shielded multi-wire harnesses within a bottom edge raceway of a panel while satisfying the above stated criteria of aesthetics and thinness of the panel.

SUMMARY OF THE INVENTION

The present invention comprises a raceway system for wall panels containing and shielding one or more internal power multi-wire harnesses that are protected from unauthorized access by lockable raceway cover plates.

More particularly, a panel incorporating the invention includes a rigid frame, the perimeter members of which include a horizontal hollow bottom frame member to serve as a channel or raceway for communications wiring. Each of the opposite vertical side frame members terminates at its lower end in a horizontally disposed bracket whose upper face is essentially coplanar with the bottom face of the lower frame member of the panel. An inside face of each bracket is fitted with a means for mounting a vertically adjustable foot or support member for the corresponding corner of the panel.

Secured to the bottom face of the lower horizontal panel frame member is an elongate raceway frame of generally I-shaped cross-sectional configuration. The overall length of the raceway frame is less than the overall width of the panel and less than the clear span between the support feet at the opposite sides of the panel. Preferably, the raceway frame comprises a pair of back-to-back oppositely facing channel members whose webs are centrally formed with an aperture for the passage of one or more internal multi-wire power harnesses whose conductors are threaded to opposite sides of the web. The web of the raceway frame is also formed with one or more pairs of generally T-shaped notches or slots having vertical edges adapted for mating engagement with central slot portions of electrical connector blocks at opposite ends of a harness.

On each side of the web, the raceway frame includes an auxiliary top flange disposed in a horizontal plane and formed with a longitudinally spaced apart pair of locking slots. On each side of the raceway web, the raceway frame also comprises a bottom lock flange portion inclined upwardly and sidewardly away from the web of the raceway frame.

Opposite sides of the raceway are closed by a pair of essentially rectangular covers of an overall length in excess of that of the raceway frame and substantially equivalent to the overall width of the panel. In order to index a cover with respect to the raceway frame, each is formed in both of the opposite end upper corners thereof with a lock notch defining a seat for engagement with an inside face of one or the other of the brackets at the lower ends of the side frames of the panels.

Each cover is formed along its upper edge with an inwardly oriented flange adapted to overlie an auxiliary top flange of the raceway frame, this cover flange containing a spaced apart pair of holes in alignment with the locking slots of the auxiliary flange of the raceway frame. Along its lower edge, each cover is formed with an inwardly directed flange that is overlain at a spaced apart pair of points by the lower end of a clip member having a flange inclined at an angle complementary to the inclination of the raceway frame lock flange such that the lock flange is receivable beneath the clip flange. The underside of the auxiliary top flange of the raceway frame, on each side, is fitted with a spaced apart pair of leaf springs each having a flexible terminal end lock point portion biased into the aligned apertures of the top flanges of the raceway frame and a raceway cover. Each cover, along its upper edge and in the sidewall thereof is formed with a pair of key hole perforations through which a tool is inserted for temporary deflection of the corresponding spring leaf in order to unlock the raceway cover with respect to the frame.

Each internal power harness comprises a pair of electrical connector blocks at opposite ends of a plurality of separate, individually insulated electrical conductor wires bundled into a harness. One of the conductors is grounded to the raceway frame. Intermediate portions of the wires of each harness are passed through the central aperture of the raceway frame web. Each connector block is slotted at one end to receive an edge of a raceway frame T-notch to be seated therein such that plug or socket connections incorporated into opposite sides of each connector block are accessible on opposite sides of the web of the raceway frame.

In a case where the raceway system is to hold two internal power harnesses, they are installed in a staggered manner. The raceway frame in this case is fitted with pairs of connector block support notches on opposite sides of the central aperture through which the intermediate portions of the conductors of each harness are passed. A bench circuit connector, such as a duplex outlet connector, may be plugged into a corresponding receptacle on a selected one of the connector blocks prior to attachment of a raceway cover, the cover being formed with windows spaced in a manner to register with and to seat an external face of the plug-in connector. When two adjacent panels are to be electrically connected, a panel jumper harness is employed, comprising a pair of connector blocks at opposite ends of a bundle of individually insulated separate electrical conductors.

In an alternative embodiment, the raceway cover locking means comprises a pair of vertically spaced apart vertically oriented raceway clips on the inside face of the cover member. As before, each clip is formed with a bottom end flange inclined at an angle complementary to the inclination of the raceway frame bottom lock flange but each clip is formed at an upper end with a spring hook, the terminal edge of which snaps into abutment behind a corresponding detent formed in the auxiliary top flange of the raceway frame. Each raceway cover is formed with a spaced apart pair of slots immediately adjacent one vertical edge of a raceway clip in the vicinity of the spring hook. A tool, comprising a generally C-shaped head presenting a sharp straight edge, is wedgedly insertible between the spring hook and the underside of the top flange of the raceway to force the spring hook away from the corresponding detent so that the upper edge of the raceway cover can be rotated away from the raceway, thus releasing the bottom flange of the clip from engagement with the bottom lock flange of the raceway frame.

BRIEF DESCRIPTION OF THE DRAWINGS

FIG. 3 is a partial perspective view, with some of the components shown in exploded relation and with parts cut away, of a pair of the panels of FIG. 1.

FIG. 4 is a partial, horizontal sectional view through a raceway structure particularly illustrating the threading of conductors and connector blocks of an internal power harness to opposite sides of a raceway web.

DESCRIPTION OF THE PREFERRED EMBODIMENTS

Figure 1:
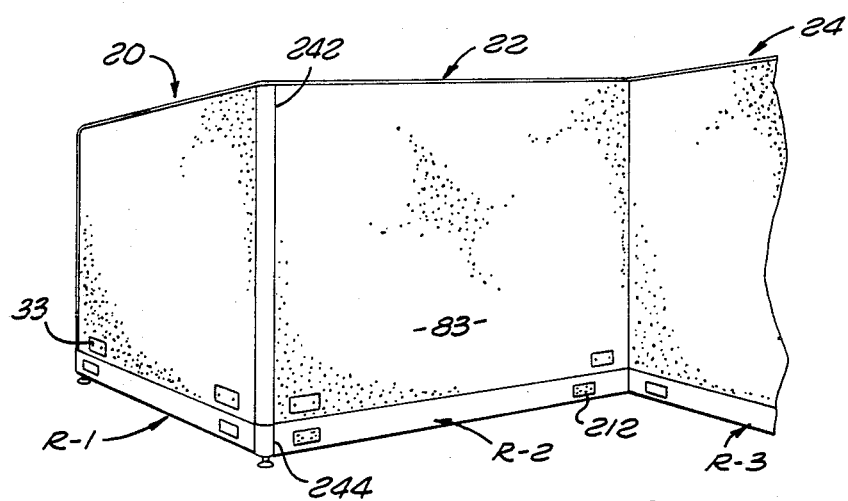
FIG. 1 is a partial perspective view of a wall system incorporating the invention.

Before explaining the invention in detail, it is to be understood that the invention is not limited in its application to the details of construction and the precise arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

FIG. 1 schematically depicts a wall system made up of a plurality of panels embodying the present invention. The wall comprises a panel 20 conventionally connected along one side to a corresponding side of a panel 22 whose other side is connected to another panel 24. The panels are prefabricated to a uniform thinness, e.g., 2 inches, but may be of various heights and widths. In the illustrated case, the panels are of a uniform height but it is assumed that the end panel 20 is relatively narrow, as compared to the intermediate panel 22, while the panel 24 is of indeterminate modular width.

The panel 20 is oriented at substantially 90 degrees to the panel 22 and the panel 24 is oriented at 90 degrees to the intermediate panel but in the opposite direction from the panel 20. However, as is well understood in the art, a series of mutually connected panels may be oriented to achieve practically any desired interior space layout. Accordingly, work stations may be defined on either or both sides of each of the panels and, as each of the work stations may require access to electrical power for the operation of equipment, each of the panels includes a raceway system along its bottom edge. Thus, in the illustrated case, the panels 20, 22, and 24 are fitted with raceway systems R-1, R-2, and R-3 respectively.

Figure 2:
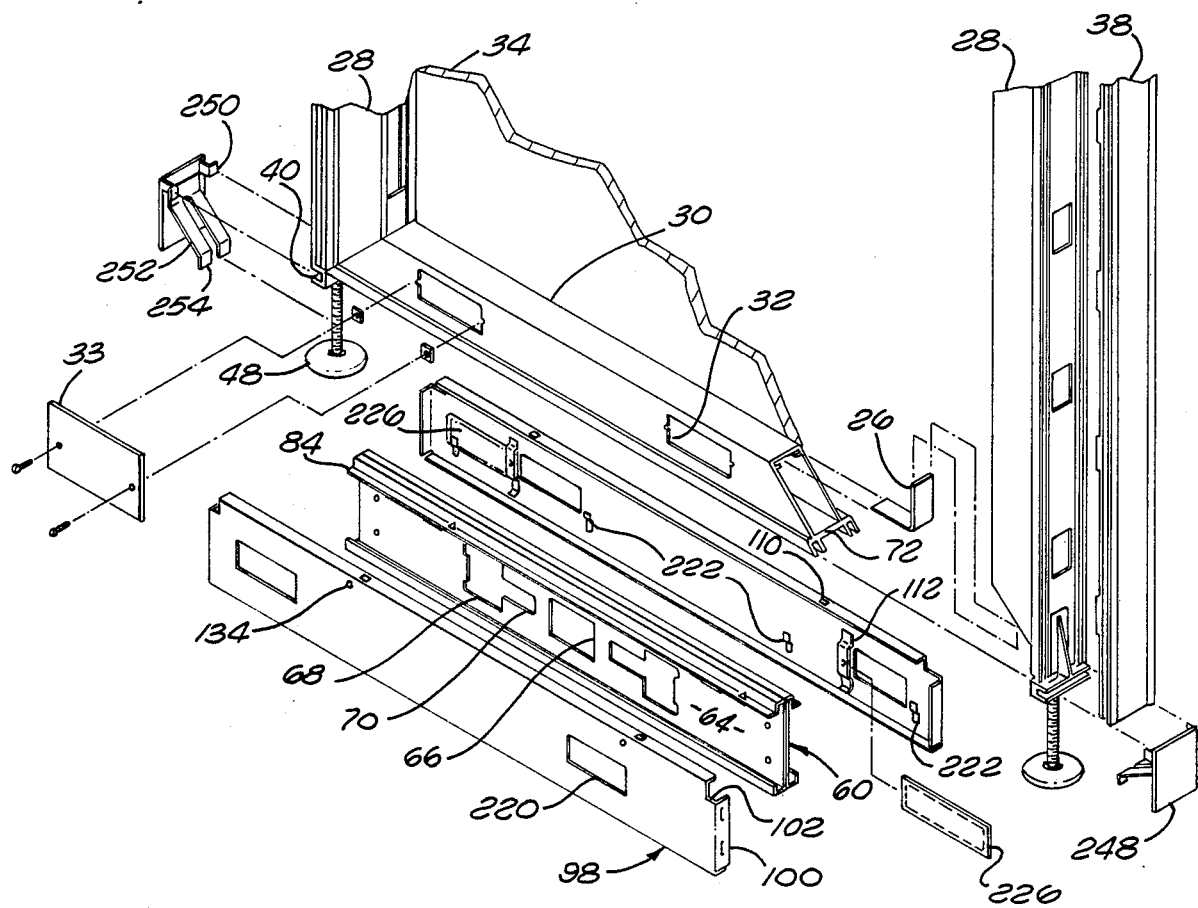
FIG. 2 is a partial, exploded perspective view of typical components of a lower end portion of one the panels of FIG. 1.

As shown in FIG. 2, each of the panels typically comprises a rigid rectangular frame including a pair of opposite side vertical frame members 28, corner brackets 26 and a horizontal bottom frame member 30. Preferably, all of the panel frame members are of a hollow construction, including a top horizontal channel, so that communications wiring can be trained therethrough and passed into bottom frame 30 from which the communications wiring can be accessed. Thus, the opposite side walls of the bottom frame member 30 may be formed with a spaced apart pair of openings 32 in registration with openings (not shown) in a structural sheet 34 conventionally overlying the corresponding side of the panel. A communications outlet cover plate 33 may be secured in place on a finished panel by a fastening means.

Figure 13:
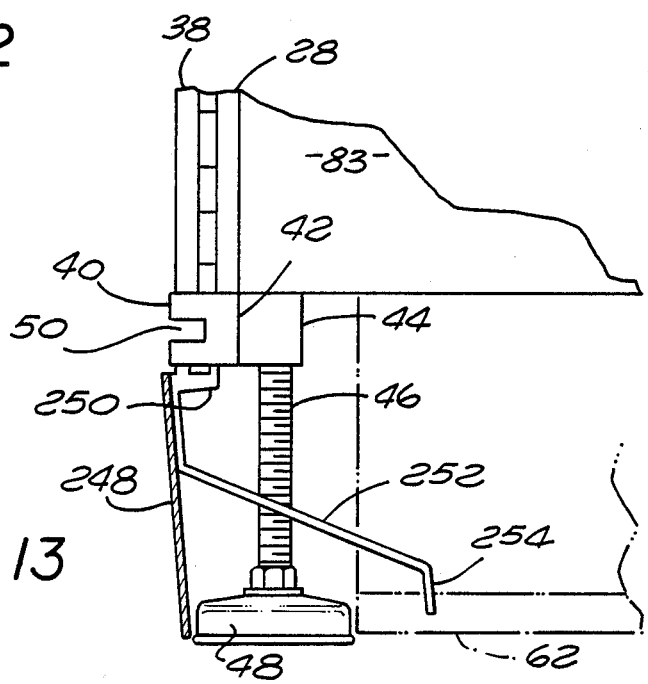
FIG. 13 is a partial elevational view illustrating installation of an end cap for the raceway.

Each of the opposite side vertical frame members 28 may be covered by an elongate detachable side rail 38 and terminates at its lower end in a rigidly affixed bracket 40. As is best seen in FIG. 13, an inside face 42 of the bracket 40 is formed along its midportion with a boss 44 that is formed with a vertically oriented tapped bore to threadedly receive the upper end of a threaded shaft 46. The lower end of the shaft 46 is fitted with a floor engaging disc-like foot 48, preferably of a diameter less than the thickness of the panel. As is apparent, adjustment of the threaded shaft 46 relative to the boss 44 at both of the opposite sides of the panel permits leveling of the panel. For horizontal alignment of one panel with respect to an adjacent panel, an outside face of the bracket 40, that is essentially flush with the outer face of the cover member 38, is formed with a horizontally disposed slot 50 adapted for the reception for one end of an alignment clip (not shown) whose other end is fitted in a corresponding slot of the bracket of the next adjacent panel.

Each raceway has a frame 60 which is generally of an I-beam configuration. Preferably, the frame 60 is made of an identical pair of sheet metal channels 62 which are secured together in back-to-back symmetrical relationship, as by a series of spaced spotwelds. The frame 60 has an overall length which is less than the overall width of the panel to which it is affixed so as to fit with a slight clearance between the pair of support feet 48 of a panel, as indicated in FIG. 13.

More specifically, each raceway frame channel has a web 64, the central portion of which has an essentially rectangular aperture 66. Equally spaced on opposite sides of the central aperture 66 the channel web is formed with a symmetrically arranged pair of generally T-shaped notches or slots 68, each including a stem section 70. As is shown in FIG. 2, the aperture 66 and slots 68 are symmetrically arranged with respect to the longitudinal axis of the channel as well as its transverse midline.

Figure 8:
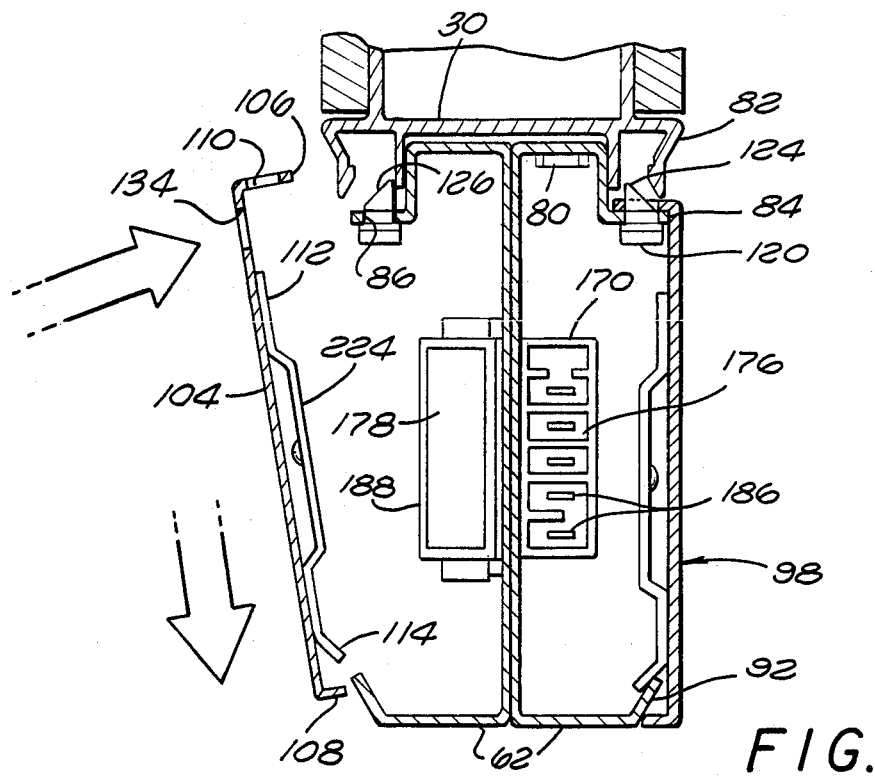
FIG. 8 is a transverse sectional view through the raceway structure of FIGS. 5 thru 7.
Figure 9:
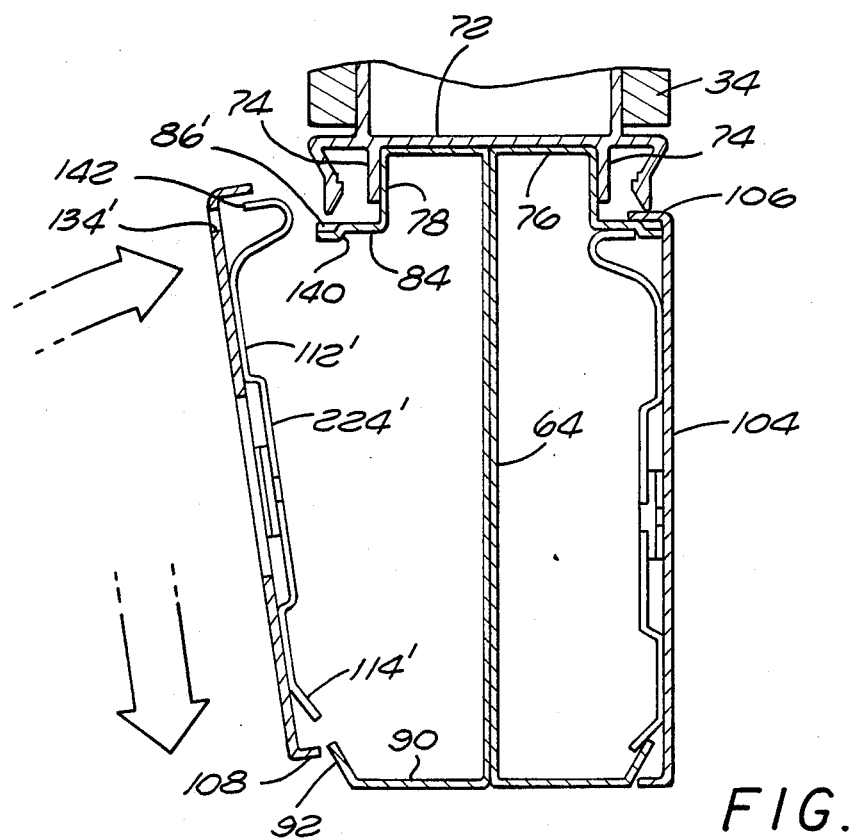
FIG. 9 is a view like FIG. 8 but showing an alternative embodiment.

As seen in FIGS. 8 and 9, the bottom panel frame member 30 may comprise an extruded member having a bottom wall 72, the underside of which is formed with a parallel pair of flanges 74. Each of the back-to-back channels 62 is formed along its upper side into a hat section comprising a top flange 76 which develops into a reversely bent section 78. The back-to-back hat sections of the channels nest between the pair of flanges 74 of the bottom frame member. In order to secure a raceway to a corresponding panel a fastening means 80 may be inserted through the top flange 76 of a channel and bottom wall 72 of the panel bottom frame 30.

The underside of the bottom frame 30 is formed along its opposite edges with a parallel pair of downwardly projecting flanges 82 spaced outwardly relative to the parallel flanges 74 therebetween. On each of the opposite sides of the panel a peripheral pocket is thus formed between a flange 74 and a flange 82 for the reception of the periphery of a fabric or other sheet covering 83 overlying structural sheet 34 of the panel frame. This, or a similar construction, is present in most commercially available panels but is noted merely to point out that the components of the raceway system should be proportioned such that when a pair of covers are in place on opposite sides of the raceway, they are desirably essentially flush with the opposite covering surfaces of the panels on which mounted.

The reversely bent portion 78 of each channel develops into an auxiliary top flange 84 projecting outwardly and in downwardly offset parallel relation to the top horizontal flange 76. In the case of the embodiment of FIG. 8, the auxiliary flange 84 is formed at a longitudinally spaced apart pair of locations with a pair of openings 86. In the embodiment of FIG. 9, the auxiliary flange 84 is formed at a spaced apart pair of locations with a pair of detent depressions 86'.

In both the FIGS. 8 and 9 embodiments of the raceway frame, each channel 62 is formed along its lower edge with a horizontal base flange 90 whose terminal edge portion develops into a lock flange 92 that is inclined upwardly and away from the web portions 64.

A raceway is closed on opposite sides of a panel by a pair of identical covers 98. Each cover preferably comprises a horizontally elongate shallow channel of a stiff but torsionally twistable material, such as sheet metal, having an overall length which is essentially the same as the overall width of the corresponding panel. More specifically, each of the opposite ends of cover 98 is formed with a vertically extending flange 100 whose outer face is substantially flush with the outer face of the bracket 40 of the corresponding panel. At each of its upper corners, the cover 98 is formed with a lock notch 102 of a profile complementary to an inside corner of the bracket 40. Thus, the inside faces 42 of the pair of brackets may serve as guides for aligning a cover 98 in accurate registration with its raceway during attachment of the cover and for preventing longitudinal movement of the cover relative to the frame 60 after the cover has been closed.

The cover 98 has a planar web portion 104 and is formed along its upper edge throughout its length between the pair of notches 102 with an in-turned flange 106. Along its lower edge, a cover 98 is formed substantially throughout its length with a shallow in-turned flange 108. In the case of the embodiment of FIG. 8, the top flange 106 is formed with a spaced apart pair of holes 110 which are located for registration with the holes 86 of the auxiliary flange 84 of the corresponding raceway frame. In the FIG. 9 embodiment, the top flange 106 is imperforate throughout its length.

In the embodiment of FIGS. 2 and 8, the inside face of the cover web 104 is fitted with a spaced apart pair of vertically oriented clip straps 112, each of which may be spot welded thereto at opposite end portions. Each strap 112 is formed in its lower end portion to define a clip portion 114 which inclines downwardly away from the web 104 at an angle complementary to the angle of the lock flange 92 in the base of a raceway frame 60. As is shown on the right hand side of FIG. 8, the inclined flange 92 is receivable between the underside of the clip flange 114 in order to lock the lower edge of the cover 98 in place when the cover is fully installed. In a similar fashion, in the embodiment of FIG. 9 the cover is fitted on its inside face with a vertically disposed strap 112' whose lower end includes an analogous clip portion 114', which operates in essentially the same detachably engageable fashion as the FIG. 8 embodiment.

Figure 6:
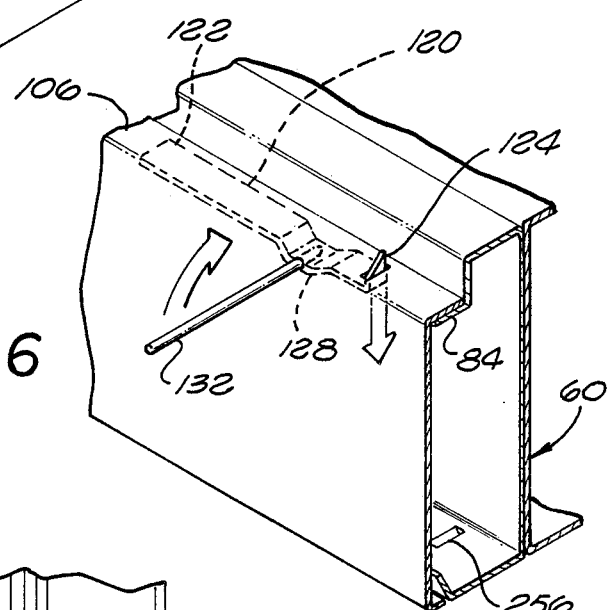

Referring to FIGS. 6 and 8, in this embodiment the raceway frame 60 is provided on each of the opposite sides of its web with a pair of leaf springs 120, each being positioned in the vicinity of one end portion of the frame. This spring 120 may take the form of an elongate strap extending along and secured to the underside of the auxiliary flange 84, as by a spot weld at a fixed end 122 of the spring. The other, resiliently flexible end of spring 120 has an integral upwardly projecting locking or lock point 124 located to register with and abut one side of a hole 86 of the auxiliary flange 84 and one of the holes 110 in the top flange 106 of raceway cover 98 to act as a cover lock means. The locking point 124 may be formed with an outwardly facing cam edge 126 which inclines downwardly and away from the point of the lock point 124. A portion of the free end of the spring 120 is formed with a shallow offset depression 128 such that, when the spring is biased against the underside of the auxiliary flange 84, a clearance is provided for the insertion of the pointed end 130 of a rod 132 into the clearance space defined by the offset 128. In order to permit insertion of the tool 132, the web 104 of the cover is formed with a pair of key holes 134 adjacent the upper edge of the cover at locations to register with the offsets 128 of the pair of springs 120.

When it is desired to install a cover 98 in the embodiment of FIG. 8, the lower edge of the cover is aligned with the corresponding lock flange 92 of the raceway frame, the cover being held such that thecover notches 102 align with the inside faces 42 of the pair of brackets 40. The cover is then lowered such that the lock flange 92 penetrates between the clip flange 114 and the inside face of the web 104 of the cover. As is indicated by the directional arrow at the top of FIG. 8, the cover 98 can then be rotated inwardly to bring the top flange 106 into place on top of the auxiliary flange 84 of the raceway frame.

During this phase of insertion, the inner edge of the top flange 106 of the raceway cover bears against the cam edge 126 of the locking point 124 of the spring 120 to momentarily deflect the locking point out of the way. After the top flange 106 of the cover is seated in place, the resilience of the spring 120 drives the locking point 124 through the aligned apertures 86 and 110 of the top flange 84 of the raceway frame and top flange 106 of the cover 98, respectively. It should be noted that the flanges 82 of the panel frame now encloses the lock points 124 so that they cannot manually or accidentally be depressed. Thus, cover 98 can be locked into place simultaneously at both of its opposite ends by brackets 40 and lock points 124 and, thereafter, cannot be removed except by the use of auxiliary the tool 132.

Figure 5:
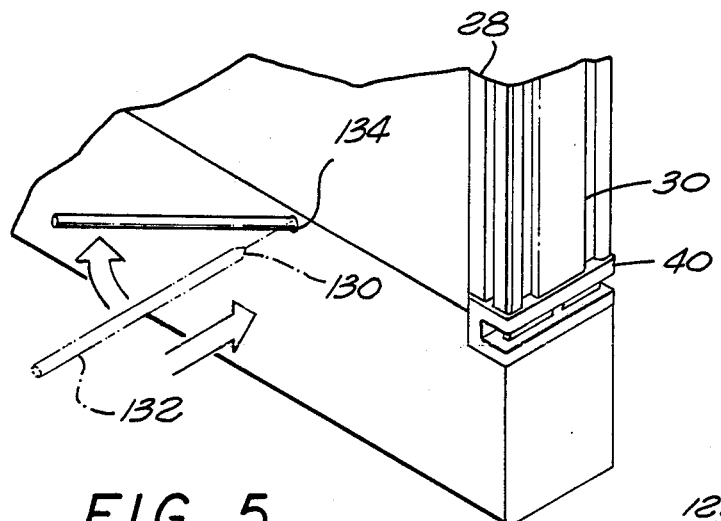
FIGS. 5, 6, and 7 are partial perspective views illustrating the sequence of operations involved in unlocking a raceway cover.
Figure 7:
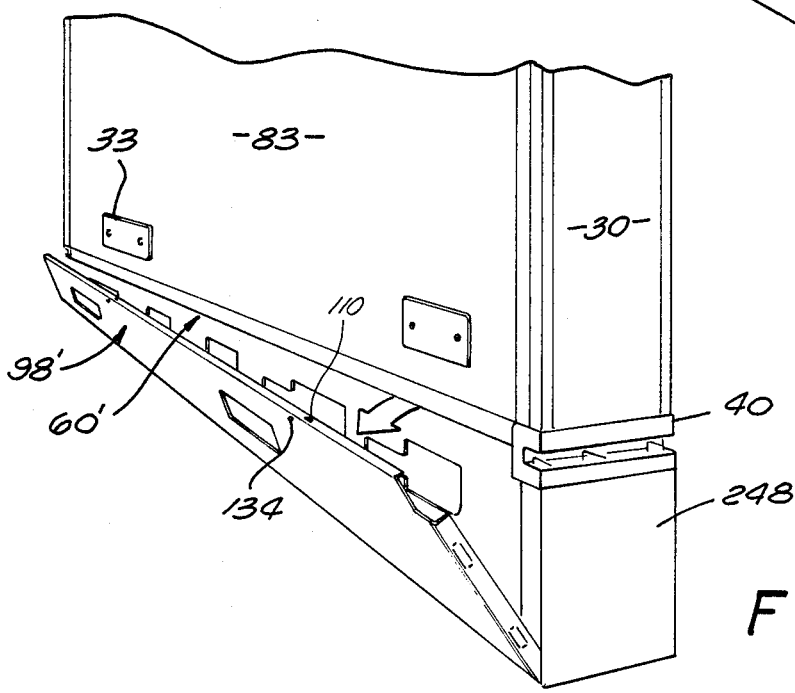

In order to remove cover 98 in this embodiment, the pointed end of tool 132 is first inserted in a horizontal mode through the corresponding hole 134 of the raceway cover, as is indicated by the dotted outline position in FIG. 5. The tool point 130 then bears on top of spring offset 128. Thereafter, the outer end of the tool is lifted, fulcrumed by the edge of hole 134, to depress the spring end portion of the spring 120 to withdraw the locking point 124 from at least the corresponding hole 110 in the top flange 106 of the cover. That end of the cover can then be turned or twisted away from the raceway. While the released end of the raceway cover is held away from locking engagement, the tool 132 is used in the same fashion at the other end of the cover such that the cover can be fully released and pivoted outwardly, as indicated in FIG. 7 wherein the cover 98 is in a position to be lifted away from the lock flange 92.

Turning to the FIG. 9 embodiment each of the straps 112 on the inside of a cover 98 is so located that when the cover is installed the strap is aligned with one of the detent depressions 86' formed in the auxiliary flange 84 of the corresponding raceway frame. On the underside of the auxiliary flange 84, the inside edge of detent depression 86' defines a stop 140. When the cover 98 is in place, the stop shoulder 140, which is preferably linear, is engaged by a preferably straight edge 142 of a spring hook 144 which may comprise an integral part of the strap 112'.

Figure 10:
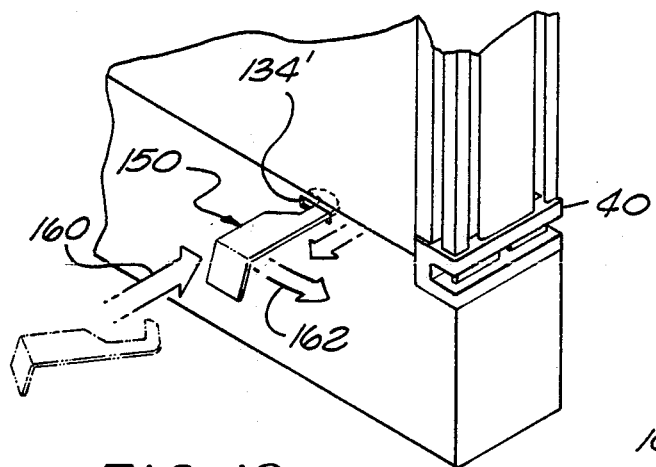
FIG. 10 is a partial, perspective view of the embodiment of FIG. 9.

In order to provide access to the locked raceway to release the lock engagement 140, 142, raceway cover 98 is formed with a spaced apart pair of openings 134'. A hole 134' preferably takes the form of a horizontally elongate slot, as best seen in FIG. 10, one end of which is adjacent to one side of the strap 112'. In the FIG. 9 embodiment, the raceway cover is installe in essentially the same manner as previously described. However, it may be noted that the spring hook 144 includes a curved portion 146 adapted for flexure of the terminal edge 142 towards and away from the underside of the top flange 106. Thus, after the lower edge of the raceway cover has been seated on the lock flange 92 of the raceway frame and as the upper edge of the cover is rotated inwardly to final seating engagement, the outer edge of the top flange 84 of the raceway frame effects downward flexure of the spring hook 144. When the cover is fully seated, as shown on the right hand side of FIG. 9, the terminal edge 142 of the spring hook springs back to seat against the stop shoulder 140 of the corresponding detent depression 86'.

Figure 11:
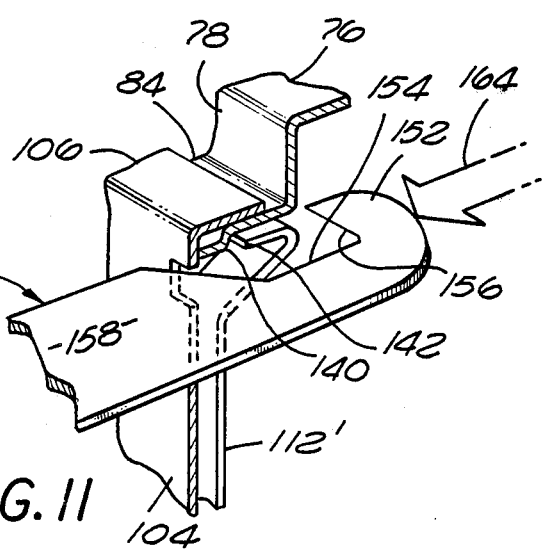
FIG. 11 is a partial perspective cutaway view similar to FIG. 10.
Figure 12:
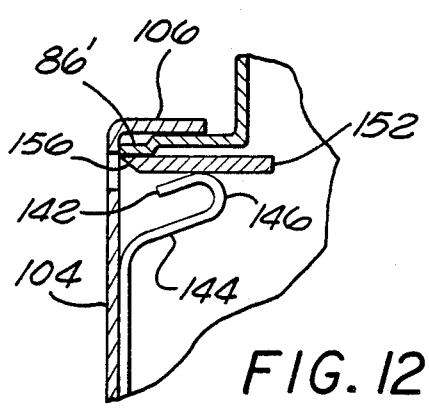
FIG. 12 is a partial sectional view of the lock structure of the embodiment of FIG. 10.

Unlocking of the raceway in the FIG. 9 embodiment is shown in FIGS. 10, 11, and 12 and is accomplished by means of a key or tool 150. This tool may be made of a sheet metal strap and comprises a generally C-shaped head 152 defined by a clearance notch 154. An outwardly facing edge 156 of tool head 152, preferably oriented at 90 degrees to the longitudinal axis of the tool, is formed as a sharp edge adapted to be wedgingly insertible between the upper face of spring hook 146 and the underside of the auxiliary flange 84 of the raceway frame.

The overall width of the tool head 152 in the plane of the straight edge 156 is greater than the length of the slot opening 134'. At the same time, the relief space 154 is so configured and made sufficiently large that those portions of the head of the tool disposed inwardly beyond a handle portion 158 can pass through the hole 134' with clearance when the tool is oriented with its longitudinal axis at an acute angle relative to the plane of the web portion 104 of the raceway cover. This attitude is shown in dotted outlined in FIG. 10. As is indicated in the Figure by directional arrow 160, the tool 150 is held in this acute angle relationship as the tool is advanced towards the panel to insert head portion 152 through the slot 134' and into a position adjacent the strap 112'. Thereafter, as indicated by directional arrow 162, the tool 150 is turned into the solid outline position shown thus bringing straight edge 156 into substantially parallel alignment with spring hook 144.

The tool can then be shifted bodily to the left as viewed in FIG. 10, to the extent permitted by clearance notch 154, to position straight edge 156 immediately behind the contacting surfaces of the underside of the upper flange 106 and the top side of spring hook 144. Thereafter, when the tool is moved outward in a direction normal to the plane of the cover web 104 in the direction of arrow 164, the undercut straight edge 156 of the tool cams spring edge 142 away from stop shoulder 140 to the position indicated in FIG. 12. The upper edge of the raceway cover 98 at that end of the raceway can then be pivoted or torsionally racked away from locking engagement with the raceway frame. The operation is then repeated at the other end of the raceway in order to fully unlock the upper edge of the raceway cover from the raceway frame, after which the cover can be turned outward and upward for releasing the lower edge of the cover from the lock flange 92.

It will now be appreciated that, in accordance with the invention, unauthorized persons not equipped with a auxiliary or raceway access tool cannot gain access to electrical wiring contained within the raceway system short of destructive forcing of the parts. At the same time, as can be seen from inspection of FIGS. 8 and 9, since the bottom wall 72 of the panel frame member 30 is imperforate, as are the hat sections of the back-to-back channels comprising raceway frame 60 (except for fasteners 80), any communication wires within the bottom frame member 30 of the panel will be shielded from any electromagnetic effect of electrical power wiring carried within the raceway system. Accordingly, the electrical wiring within the raceway may be employed in the form of individually insulated electrical conductor wires which need not be protected and shielded within DX or conduit tubing.

FIG. 3 shows raceways R-1 and R-2 of adjacent panels 20 and 22 carrying two separate runs C-1 and C-2 power harnesses. Each run comprises a linearly interconnected series of flexible electrical, e.g., 6 wire power harnesses of the kind schematically illustrated in FIG. 4 and one or more panel jumper harnesses for electrically interconnecting power harnesses of the same run C-1 or C-2 between adjacent panels.

More particularly, FIG. 4 illustrates a typical web section 64 of a raceway frame having a central passthrough or aperture opening 66 flanked by a pair of generally T-shaped notches 68. Each power harness P comprises an identical pair of connector blocks 170 mechanically and electrically interconnected to opposite ends of a bundle of a desired number of individual and individually electrically insulated wire conductors 172. For clarity of illustration the individual conductors are not depicted in FIG. 4 but are visible in FIG. 3, wherein a 4 wire group of the conductors 172 are bundled by means of a tape 174, or the like, at some intermediate point between the pair of connector blocks 170.

Intermediate portions of the bundled wires 172 can be secured in place by a plastic push button wire-tie 166 inserted through an appropriately located hole through the web portion of the raceway frame 60. Preferably, an end of a ground wire 172-1 of each harness is trained out of the bundle of wires and is fitted at an end with a grounding grommet 168 through which the wire can be earth-grounded onto the web of the raceway by an appropriate screw. Each panel must be individually grounded.

The connector block 170 may be of kind that is commercially available, as for example from Pent Inc. of Kendallville, Ind. Each block 170 comprises a body formed at one end with a pair of receptacles 176 and 178 divided by a slot 180 extending transversely through the body. As is shown in FIG. 4, the body slot 180 is of a width to nestingly receive one vertical edge of a notch 68 of a raceway frame web 64. The receptacles 178 and 176 are thus disposed on opposite sides of the web so that power from the harness can be made available on either side of the panel in which it is installed, as will subsequently appear. At the opposite end, the body of connector 170 is integrally formed with a third receptacle 182, in line with either receptacle 178 or 176 so as to be disposed on either one side or the other of the raceway frame web 164.

As is shown in FIG. 8 for the right hand receptacle 176, all of receptacles 176, 178 and 182 contain a series of blade plug elements 186 projecting from a floor of the receptacle and protectively surrounded by a wall 188. The blade plugs 186 and the receptacles as a whole are thus oriented parallel to the long axis of each raceway. As shown only for the right hand receptacle 176, each receptacle wall 188 may integrally contain a unique baffle pattern for isolating adjacent blade plugs 186 from one another and in order to be compatible only with a matingly configured socket. Connector block 170 also has a face 200, offset inwardly beyond the opening to receptacle 182, through which each of the conductor wires 172 passes to be electrically connected to the several blade plugs 186.

Referring to FIG. 3, the panel 22 is adapted to carry a pair of power harnesses P-1 and P-2. Harness P-1 comprises a part of run C-1 while harness P-2 comprises a part of run C-2. In order to accommodate the pair of power harnesses, panel 22 has a raceway frame 60', which is relatively long as compared to the raceway frame 60 of FIG. 2, so that the web of the raceway frame can accommodate another pair of T-shaped notches 68', spaced outwardly from the center of the raceway frame to flank the inner pair of T-shaped notches 68.

Each of the harnesses P-1 and P-2 has its pair of connector blocks 170 mounted in one of the notches 68 and a notch 68'. The two harnesses P-1 and P-2 are thus in overlapping or staggered relationship such that a connector block 170 of one of the harnesses is positioned approximately midway between the pair of connector blocks 170 of the other harness. Both harnesses, however, have a portion of their bundled wires 172 passing through the central aperture 66 of the raceway frame 60'.

Each of the endmost connector blocks 170 of the harnesses P-1 and P-2 may be electrically connected to an endmost connector block of a harness in an adjacent panel, such as the panel 20, by means of a jumper harness J, in the same run C-1 or C-2. Each jumper harness J comprises a identical pair of connector blocks 206 at opposite ends of a bundled group of individual and individually insulated conductor wires 208. While not shown, it will be understood that each of the rectangular connector blocks 106 in its endmost face is formed, e.g., as a socket receptacle compatible with a blade plug receptacle 176 or 178 of a connector block 170 of a harness P.

In order to gain access to one or the other power harnesses from a work station adjacent to a panel, conventional outlet connector blocks 212, adapted for mating engagement with one of the plug receptacles of a connector block 170, may be employed. The outlet connector blocks 212 may comprise a substantially rectangular body having at one end a socket receptacle 214 configured for mating electrical connection with a plug receptacle 178 or 176. Each block has an outside face which includes an outwardly offset rectangular area 216 having a socket or sockets, such as a duplex outlet having a pair of three prong sockets 218. The offset area 216 of each block is configured for mating reception with a window 220 formed through the web portion 104 within an end portion of a cover 98 or 98'.

Referring to FIG. 2, it will be seen that the inside face of the cover 98 or 98' is fitted with a pair of spring clips 222 on opposite sides of each strap 112 or 112', while the straps 112 or 112' have an offset central portion 224 or 224' configured to receive thereunder a slideable cover plate 226. Each cover plate of a raceway may be employed to cover those windows in the web of the cover 98 which are not employed for the reception of an outlet. At the same time, a cover plate that has been removed from a window 220 may be held in a stored position, as indicated in FIG. 2.

The power harnesses of a panel may either be field-installed or installed during manufacture of the panel. In the former case, it will be appreciated that the raceway cover 98 can be removed in order to mount the harnesses P and J and/or outlet connector blocks 212, after which the cover can be installed and locked.

In order to introduce power from an external source to the raceway system, a power cable 230 fitted at one end with a power connector block 232, as shown in FIG. 3, may be employed. The power connector block has on its outside face an outwardly offset portion 234 configured for reception within a corresponding window 220 of the raceway cover. At least one end the power connector block is formed with a socket receptacle 236 adapted for mating and electrical interconnection with, preferably, the plug receptacle 182 of a connector block 170. Prior to connecting the power block to a connector block 170, the corresponding cover 98 will have been removed and the remote end of the power cord first threaded through the raceway cover window, so that after connection of the power block into the raceway the corresponding cover can be reinstalled and locked in place.

The raceway system may be fully enclosed by the use of appropriately configured end caps and/or corner caps. Thus, referring to FIG. 1, the corner-defining panels 20 and 22 may be conventionally closed at the corner junction by a quarter-round cap 242 subtending an arc of 90 degrees which may, for example, simply be spring clipped in place in grooves provided in the corner posts of the panels. In a similar fashion, the junction of the raceways R-1 and R-2 may be closed by a corner cap 244 in substantially the same manner. In that connection, it may be noted that the opposite end vertical flanges 100 of the raceway cover 98 may be formed with a pair of vertically spaced apart vertically disposed detent depressions 246 adapted to compact with cooperating portions of the corner cap to releasably hold the corner cap in place.

To close an end of a raceway, an end cap 248 such as shown in FIG. 2 may employed. Each cap comprises a substantially rectangular plate with an inside surface fitted with an opposite pair of L-shaped tabs 250 along its upper edge adapted for frictionally engaging and clamping to studs on the underside of an alignment bracket 40. Beneath the pair of tabs, the end cap is fitted with a pair of legs 252 inclining downwardly and away from the inner surface of the end cap and each terminating in a clip prong 254 adapted to engage an appropriately located slot 256 formed in the bottom flange 90 of each of the back-to-back channels of the raceway.

We claim:

1. In a wall panel of substantially rectangular configuration comprising a rigid frame having a parallel pair of vertical frame members at the opposite side edges of said panel, a horizontally disposed bottom frame member, and a raceway for electrical power wires connected to the bottom of the bottom frame member, the improvement comprising:
   a raceway frame for said raceway secured to and extending along said bottom frame member;
   a horizontally elongate substantially rectangular raceway cover of a horizontal length substantially equivalent to the overall width of said panel and of an area to substantially fully enclose a side of said raceway;
   detachably engageable means, comprising cooperating portions on a lower horizontal edge of said cover and on a lower portion of said raceway frame, for detachably securing said lower edge of said cover to said raceway frame in a manner to prevent displacement of said cover away from said raceway frame when an upper horizontal edge of said cover is locked to said raceway frame; and
   lock means from locking a portion of said upper edge of said cover to said raceway frame in a manner to prevent displacement of said upper edge of said cover away from said raceway frame otherwise then by actuation of said lock means by an auxiliary tool.

2. The improvement of claim 1 wherein:
said lock means comprises a stop means, comprising mutually abutting parts of said cover and said panel, to prevent longitudinal displacement of said cover on said raceway frame when said cover is in a closed condition closing a side of said raceway.

3. The improvement of claim 2 wherein:
said mutually abutting parts comprise a pair of stop notches at the upper corners of said cover.

4. The improvement of claim 1 wherein:
said lock means comprises a stop means, comprising mutually abutting parts on said cover and said raceway frame, to prevent pivotal displacement of said upper edge of said cover away from said raceway frame when said cover is in a closed condition closing a side of said raceway.

5. The improvement of claim 4 wherein:
said mutually abutting parts comprise a lock point yieldably mounted on a flange of said raceway frame and an aperture in a top flange of said cover,
said lock point normally penetrating said aperture to prevent pivotal displacement of said cover away from said raceway frame when said cover is in a closed condition closing a side of said raceway;
said bottom frame member of said panel being formed with a downwardly projecting flange disposed to obstruct access to said lock point to prevent withdrawal of said lock point from said aperture otherwise then by actuation of said lock point by an auxiliary tool.

6. The improvement of claim 4 wherein:
said mutually abutting parts comprise a detent on a flange of said raceway frame and a spring hook carried on an inside face of said cover, said spring hook having an end normally confronting an inside edge of said detent to prevent pivotal displacement of said cover away from said raceway frame when said cover is in a closed condition closing a side of said raceway.

7. The improvement of claim 6 wherein:
said cover is formed with an opening in the vicinity of said spring hook to permit access into said raceway for insertion of an auxiliary tool into operative alignment with said spring hook,
whereby said end of said hook can be displace by said tool out of interfering alignment with said detent to permit pivotal displacement of said cover away from said raceway frame.

8. The improvement of claim 4 wherein:
said lock point comprises a free end of a leaf spring having an opposite end portion affixed to the underside of said flange of said raceway frame,
said leaf spring having an intermediate portion between said ends of said leaf spring that is offset away from said flange of said raceway frame to define a clearance space,
said cover being formed with an access opening in alignment with said clearance space to permit insertion of an auxiliary tool for withdrawing said lock point out of locking engagement with said aperture of said top flange of said cover.

9. The improvement of claim 4 wherein:
said lock point and said top flange of said cover have cooperating cam engagement means for depressing said lock point into said aperture of said top flange of said cover upon mutual engagement therebetween during pivotal movement of said cover towards said raceway frame as said cover is moved to a closed condition closing a side of said raceway.

10. The improvement of claim 6 wherein:
said spring hook on said inside face of said cover and an edge of said flange of said raceway frame have cam engagement means for depressing said spring hook during pivotal movement of said cover towards said raceway frame when said cover is being moved to a closed condition closing a side of raceway.

11. A wall panel comprising:
a substantially rectangular panel frame having a bottom frame member;
an elongate raceway frame mounted against the underside of said bottom frame member to extend horizontally therealong,
said raceway frame having a substantially coextensive longitudinally extending medial web,
said raceway frame having, symmetrically disposed on opposite sides of said web, upper and lower portions in parallelism to said web and spaced laterally sidewardly away from said web;
a pair of substantially identical horizontally elongate substantially rectangular raceway covers of a horizontal length substantially equivalent to the overall width of said panel and of an area to substantially fully enclose a side of said raceway frame;
detachably engageable means, comprising cooperating portions of a lower horizontal edge of each of said covers and of said lower portion of said raceway frame on a corresponding side of said web, for detachably securing said lower edge of said cover to said raceway frame in a manner to prevent displacement of said cover away from said raceway frame when an upper horizontal edge of said cover is locked to said raceway frame on a corresponding side of said web; and
lock means for locking a portion of said upper edge of each of said covers to a corresponding side of said raceway frame in a manner to prevent displacement of said upper edge of said cover away from said raceway frame otherwise then by actuation of said lock means by an auxiliary tool.

12. A wall panel as in claim 11 wherein:
said panel frame comprises a parallel pair of vertical frame members at the opposite side edges of said panel;
a spaced apart pair of support foot means extending downwardly from said panel at said opposite side frame members for supporting said panel in an upright position;
said raceway frame having a length substantially equivalent to the clear space between said pair of support foot means;
said lock means for each of said covers comprising a stop means, including mutually abutting parts of each of said covers and said panels, to prevent longitudinal displacement of said cover on said raceway frame when said cover is in a closed condition closing a side of said raceway.

13. A panel as in claim 12 wherein:
said mutually abutting parts comprise a pair of stop notches at the upper corners of each said cover and a pair of horizontally disposed brackets at opposite ends of said underside of said bottom frame member,
each of said brackets having an inside face comprising one of said mutually abutting parts.

14. A wall panel as in claim 11 in which:
said upper portion of said raceway frame, on each side of said web, comprises a longitudinally extending auxiliary flange and an upper edge of each said cover comprises a longitudinally extending flange adapted to overlie said auxiliary flange when said cover is in a fully closed condition,
each of said covers having a pair of said lock means for locking a portion of said upper edge of each said cover to a corresponding side of said raceway frame,
each said lock means comprising apertures through said auxiliary flange and through said flange along said upper edge of said cover, said apertures being disposed in registration with one another when said cover is in a closed condition;
said lock means further comprising a leaf spring having one end portion affixed to the underside of said auxiliary flange of said raceway frame and having an opposite end portion mounting a lock point positioned for normally penetrating said registered apertures to prevent pivotal displacement of said cover away from said raceway frame when said covers are in a closed condition closing a side of said raceway;
said leaf spring having an intermediate portion between said ends of said leaf spring that is offset away from said flange of said raceway frame to define a clearance space,
said cover being formed an with access opening in alignment with said clearance space to permit insertion of an auxiliary tool for withdrawing said lock point out of locking engagement with said registered apertures to permit pivotal displacement of said cover away from said raceway frame.

15. A wall panel as in claim 11 in which:
said upper portion of said raceway frame, on each side of said web, comprises a longitudinally extending auxiliary flange and each of said covers comprises a longitudinally extending upper edge flange adapted to overlie said auxiliary flange when said cover is in a closed condition closing a side of said raceway;
each said cover having a pair of said lock means,
each said lock means comprising a detent on said auxiliary flange and a spring hook mounted on the inside of said cover;
said spring hook having an end normally confronting an inside edge of said detent to prevent pivotal displacement of said cover away from said raceway frame when said cover is in a closed condition closing a side of said raceway;
each said cover being formed with an opening in the vicinity of said spring hook to permit access into said raceway for insertion of an auxiliary tool into operative alignment with said spring hook,
whereby said end of said hook can be displaced by said tool out of interfering alignment with said detent to permit pivotal displacement of said cover away from said raceway frame.

16. Wall panel having an electrical power raceway system along its lower edge enclosing at least one multiwire power harness, said panel comprising:
an elongate raceway frame secured to the lower edge of said panel, said raceway frame having a substantially coextensive medial web extending longitudinally thereof, said web being formed between its opposite ends with an aperture therethrough affording a passage from one side to the other side of said web for conductor wires of an electrical power harness, said web also being formed with a pair of notches therethrough positioned beyond opposite ends of said aperture;

a multi-wire power harness comprising a pair of connector blocks at opposite ends of a bundled plurality of individual, individually insulated conductor wires, each of said connector blocks being formed with a pair of electrical connector receptacles accessible through an endwise outwardly facing end thereof;

each said connector block and each said notch of said web having coacting means for seating a corresponding connector block in a manner that each of said pair of receptacles is positioned on opposite sides of said web, at least some of said bundled conductor wires extending through said aperture to pass from one side to the other side of said web to be connected at opposite ends to an inwardly facing end of said connector; and a pair of substantially rectangular covers connected to opposite sides of said raceway frame to substantially fully enclose the opposite sides of said raceway frame, at least one of said covers being formed with a window therethrough located in a position for accessing one of said receptacles of one of said connector blocks of said harness through said window.

17. A panel as in claim 16 in which:

one of said plurality of said conductor wires is a ground wire, said ground wire having an end trained out of said bundled plurality of wires and electrically connected to said raceway frame, said raceway frame being made of an electrically conductive earth-groundable material.

18. A panel as in claim 16 in which:

said coacting means of each said connector block and each said notch comprises a slot formed in said end-wise outwardly facing end of said connector block and an edge of said notch that is receivable within said slot, said slot being oriented in a manner that each of said pair of receptacles is positioned on opposite sides of said web.

19. A panel as in claim 16 in which:

each of said covers is detachably connected to said raceway frame; and said panel has a lock means at each of the opposite sides of said panel to prevent displacement of the corresponding one of said covers away from said raceway frame otherwise then by actuation of said lock means by an auxiliary tool.

20. A panel as in claim 16 further comprising:

a jumper harness comprising a pair of electrical connector blocks at opposite ends of a bundled plurality of individual, individually insulated conductor wires, each said jumper connector blocks having an endmost face adapted for mating electrical connection to one of said receptacles of one of said connector blocks of said power harness, whereby said power harness of said panel can be electrically connected to an electrically conductive harness of an adjacent panel.

21. A wall panel having an electrical power raceway system along its lower edge, said panel comprising:

an elongate raceway frame secured to the lower edge of said panel, said raceway frame having a substantially coextensive medial web extending longitudinally thereof, said web being formed between its opposite ends with an aperture therethrough affording a passage from one side to the other side of said web for conductor wires of an electrical power harness;

said web having a pair of first notches therethrough positioned beyond opposite ends of said aperture, said web also having a pair of second notches therethrough positioned beyond opposite ends of said aperture such that one of said first notches and one of said second notches is at an opposite end of said aperture from the others of said first and second notches;

first and second multi-wire powerharnesses each comprising a pair of connector blocks at opposite ends of a bundled plurality of individual, individually insulated conductor wires, each of said connector blocks being formed with a pair of electrical connector receptacles accessible through an endwise outwardly facing end thereof, each said connector block and each said notch of said web having coacting means for seating a connector block within a notch in a manner that each of said pair of receptacles is positioned on opposite sides of said web, at least some of said bundled conductor wires of each said harness extending through said aperture to pass from one side to the other side of said web to be connected at opposite ends of said at least some conductor wires to an inwardly facing end of the corresponding ones of said connector blocks;

one of said pair of connector blocks of said first harness being seated in one of said first notches beyond one end of said aperture while the other of said pair of connector blocks of said first harness is seated in one of said pair of second notches beyond the opposite end of said aperture;

one of said connector blocks of said second power harness being seated in the remaining one of said pair of first notches beyond one end of said aperture while the other of said pair of connector blocks of said second harness is seated within one of said pair of second notches beyond the opposite end of said aperture;

whereby said first and second power harnesses are mounted on said raceway frame in overlapping staggered relationship with each of said power harnesses having a connector block positioned intermediate the pair of connector blocks of the other of said power harnesses.

22. A panel as in claim 21 further comprising:

a pair of substantially rectangular covers connected to opposite sides of said raceway frame to substantially fully enclose the opposite sides of said raceway frame, at least one of said covers being formed with a window therethrough located in a position for accessing one of said receptacles of one of said connector blocks of one of said harnesses through said window.

* * * * *